(12) United States Patent
Nagayasu et al.

(10) Patent No.: US 8,506,693 B2
(45) Date of Patent: Aug. 13, 2013

(54) $CO_2$ RECOVERY SYSTEM AND $CO_2$ RECOVERY METHOD

(75) Inventors: Hiromitsu Nagayasu, Tokyo (JP); Takashi Kamijo, Tokyo (JP); Takahito Yonekawa, Tokyo (JP); Hiroshi Tanaka, Tokyo (JP); Shinya Kishimoto, Tokyo (JP); Takuya Hirata, Tokyo (JP); Tatsuya Tsujiuchi, Tokyo (JP); Masaru Chiyomaru, Tokyo (JP); Koji Nakayama, Hiroshima (JP); Masahiko Tatsumi, Hyogo (JP); Yasuyuki Yagi, Hyogo (JP); Kazuhiko Kaibara, Hyogo (JP)

(73) Assignees: Mitsubishi Heavy Industries, Ltd, Tokyo (JP); The Kansai Electric Power Co., Inc., Osaka-shi, Osaka (JP)

( * ) Notice: Subject to any disclaimer, the term of this patent is extended or adjusted under 35 U.S.C. 154(b) by 225 days.

(21) Appl. No.: 12/900,108

(22) Filed: Oct. 7, 2010

(65) Prior Publication Data

US 2011/0135550 A1 Jun. 9, 2011

(30) Foreign Application Priority Data

Dec. 3, 2009 (JP) .................................. 2009-275616

(51) Int. Cl.
*B01D 53/14* (2006.01)

(52) U.S. Cl.
USPC ............................. 96/243; 423/288; 422/170

(58) Field of Classification Search
USPC ...................... 96/234, 243, 267; 95/149, 187, 95/188, 193, 199, 206, 209, 236; 423/220, 423/228, 229; 422/169–171
See application file for complete search history.

(56) References Cited

U.S. PATENT DOCUMENTS 3,339,342 A * 9/1967 Blaker et al. .................... 95/169
5,378,442 A 1/1995 Fujii et al.

(Continued)

FOREIGN PATENT DOCUMENTS

| CA | 2 749 823 A1 | 9/2010 |
|---|---|---|
| EP | 2 085 133 A1 | 8/2009 |

(Continued)

OTHER PUBLICATIONS

Russian Office Action dated Jan. 30, 2012, issued in corresponding Russian Patent Application No. 2010146179/05.

(Continued)

*Primary Examiner* — Frank Lawrence, Jr.
(74) *Attorney, Agent, or Firm* — Westerman, Hattori, Daniels & Adrian, LLP

(57) ABSTRACT

A $CO_2$ recovery system includes an absorber 2 and a regenerator 3. The absorber 2 includes a $CO_2$ absorbing section 21 and at least one water-washing section 22. The $CO_2$ absorbing section 21 allows flue gas 101 to come into contact with a basic amine compound absorbent 103 so that the basic amine compound absorbent 103 absorbs $CO_2$ in the flue gas 101. The at least one water-washing section 22 allows the decarbonated flue gas 101A in which the amount of $CO_2$ has been reduced in the $CO_2$ absorbing section 21 to come into contact with wash water 104A and 104B to reduce the amounts of the basic amine compounds entrained in the decarbonated flue gas 101A. The regenerator 3 releases the $CO_2$ from the basic amine compound absorbent 103 containing $CO_2$ absorbed therein.

10 Claims, 6 Drawing Sheets

(56) References Cited

U.S. PATENT DOCUMENTS

| | | | |
|---|---|---|---|
| 5,904,908 A * | 5/1999 | Suzuki et al. | 423/228 |
| 7,056,482 B2 * | 6/2006 | Hakka et al. | 423/230 |
| 7,772,449 B2 * | 8/2010 | Kurukchi et al. | 585/854 |
| 2003/0045756 A1 | 3/2003 | Mimura et al. | |
| 2004/0265199 A1 | 12/2004 | MacKnight | |
| 2007/0053817 A1 | 3/2007 | Iijima et al. | |
| 2008/0112869 A1 * | 5/2008 | MacKnight | 423/228 |
| 2009/0155889 A1 | 6/2009 | Handagama et al. | |
| 2009/0193970 A1 | 8/2009 | Iijima | |
| 2010/0061904 A1 * | 3/2010 | Lund et al. | 423/229 |
| 2011/0041685 A1 * | 2/2011 | Tanaka et al. | 95/16 |
| 2011/0308389 A1 * | 12/2011 | Graff et al. | 95/166 |

FOREIGN PATENT DOCUMENTS

| | | | |
|---|---|---|---|
| FR | 2 958 180 A1 | 10/2011 | |
| GB | 2 454 266 A | 5/2009 | |
| JP | 5-184867 A | 7/1993 | |
| JP | 8-080421 A | 3/1996 | |
| JP | 10-033938 A | 2/1998 | |
| JP | 2002-126439 A | 5/2002 | |
| JP | 2007-190553 A | 8/2007 | |
| JP | 2007-222847 A | 9/2007 | |
| JP | 2008-238114 A | 10/2008 | |
| JP | 2009-179546 A | 8/2009 | |
| RU | 2230599 C2 | 1/2004 | |
| RU | 2369428 C2 | 10/2009 | |
| WO | 2009/056830 A1 | 5/2009 | |
| WO | 2010/102877 A1 | 9/2010 | |

OTHER PUBLICATIONS

Canadian Office Action dated Sep. 24, 2012, issued in corresponding Canadian Patent Application No. 2,719,640, (3 pages).
Canadian Office Action dated Jan. 18, 2012, issued in corresponding Canadian Patent Applicartion No. 2,719,640.
Russian Office Action dated Sep. 21, 2011, issued in corresponding Russian Patent Application No. 2010146179.
Australian Office Action dated Nov. 2, 2011, issued in corresponding Australian Patent Application No. 2010236043.
Australian Notice of Acceptance dated Nov. 20, 2012 issued in corresponding Australian patent application No. 2010236043.
Extended European Search Report dated Oct. 17, 2012, issued in corresponding European Patent Application No. 10188183.7 (12 pages).
Notice of Allowance dated Apr. 24, 2013, issued in corresponding Canadian Patent Application No. 2,719,640.
Japanese Office Action dated Mar. 19, 2013, issued in corresponding Japanese Patent Application No. 2009-275616, with English translation (5 pages).

* cited by examiner

FIG.6

| | | CONVENTIONAL EXAMPLE | EXAMPLE |
|---|---|---|---|
| ABSORBENT-TREATING SECTION | ABSORBENT-TREATING SECTION | NO | YES |
| | TYPE OF ACID USED | - | SULFURIC ACID |
| | pH OF ACIDIC WATER | - | 5.0 |
| | L/G OF ACIDIC WATER | - | 2.5 (L/h)/(m³/h) |
| VOLATILE ORGANIC COMPOUND-TREATING UNIT | VOLATILE ORGANIC COMPOUND-TREATING UNIT | NO | YES |
| | FLOW RATE SUPPLIED TO VOLATILE ORGANIC COMPOUND-TREATING UNIT | - | 20% RATIO OF CIRCULATION FLOW RATE |
| CONCENTRATION OF AMINE COMPOUNDS AT OUTLET OF ABSORBER | | 8.0ppm | 0.2 ppm OR LESS |
| CONCENTRATION OF VOLATILE ORGANIC COMPOUNDS AT OUTLET OF ABSORBER | | 5.0ppm | 0.5 ppm OR LESS |

CO₂ RECOVERY SYSTEM AND CO₂ RECOVERY METHOD

TECHNICAL FIELD

The present invention relates to a $CO_2$ recovery system and a $CO_2$ recovery method for reducing the concentrations of residual basic amine compounds emitted together with decarbonated flue gas in which the amount of $CO_2$ has been reduced by contact with an absorbent.

BACKGROUND ART

The greenhouse effect due to $CO_2$ has been pointed out as one of the causes of global warming, and there is an urgent need to take global measures against the greenhouse effect to protect the global environment. The sources of $CO_2$ can be found in various fields of human activities in which fossil fuels are burnt, and there is an increasing tendency to tighten $CO_2$ emission regulations. Accordingly, extensive studies have been conducted on $CO_2$ recovery methods applicable to power generation facilities, such as thermal power plants, which use a large amount of fossil fuels. In these methods, flue gas from a boiler is brought into contact with an amine-based absorbent such as an aqueous solution of an amine compound to collect and recover $CO_2$ in the flue gas.

When such an absorbent is used to recover $CO_2$ from flue gas, the amine compound is entrained in the decarbonated flue gas in which the amount of $CO_2$ has been reduced. Therefore, to prevent air pollution by the amine compound, the amount of the amine compound emitted together with the decarbonated flue gas must be reduced.

PTL 1 discloses a conventional amine recovery system. This system includes a plurality of stages of water-washing units for collecting an amine compound entrained in decarbonated flue gas. In each water-washing unit stage, wash water is brought into gas-liquid contact with the decarbonated flue gas in which the amount of $CO_2$ has been reduced by gas-liquid contact with an absorbent that absorbs $CO_2$. The amine entrained in the decarbonated flue gas is collected sequentially in the plurality of stages of the water-washing units. As the wash water used in PTL 1, condensed water is used which is produced by condensing and separating water contained in $CO_2$ during a process of regenerating the amine-based absorbent by removing $CO_2$ from the $CO_2$-absorbed amine-based absorbent.

PTL 2 discloses a conventional decarbonation system including: a cooling unit for cooling decarbonated flue gas in which the amount of $CO_2$ has been reduced by gas-liquid contact with an absorbent; and a contact unit in which condensed water condensed in the cooling unit is brought into countercurrent contact with the decarbonated flue gas. PTL 2 discloses another decarbonation system that includes a water-washing unit for collecting the amine compound entrained in decarbonated flue gas by bringing wash water into gas-liquid contact with the decarbonated flue gas in which the amount of $CO_2$ has been reduced by gas-liquid contact with an absorbent. The wash water used is condensed-water condensed in a cooling tower for cooling the flue gas from which $CO_2$ has not been recovered.

In a conventional method disclosed in PTL 3, sulfuric acid is sprayed into decarbonated flue gas in which the amount of $CO_2$ has been reduced by gas-liquid contact with an absorbent. The amine compound entrained in the decarbonated flue gas is thereby converted to a basic amine compound sulfate. Then the decarbonated flue gas containing the sulfate of the basic amine compound passes through a demister to collect the sulfate of the basic amine compound from the decarbonated flue gas.

CITATION LIST

Patent Literature

[PTL 1] JP 2002-126439A
[PTL 2] JP H08-80421A
[PTL 3] JP H10-33938A

SUMMARY OF INVENTION

Technical Problem

In recent years, from the viewpoint of environmental protection, there is a demand to further reduce the concentrations of residual absorbent components emitted together with decarbonated flue gas. It is expected in the future that a $CO_2$ recovery system is applied to flue gas from, for example, a thermal power plant in which the flow rate of processed gas is high. In this case, the emission amounts of residual absorbent components emitted together with the decarbonated flue gas tend to increase because the emission amount of the flue gas is high. Therefore, the concentrations of the emitted absorbent components must be further reduced.

In PTL 3, sulfuric acid is spayed into the flue gas from a decarbonator to bring the sulfuric acid into contact with the basic amine compound in the flue gas. The sulfide of the basic amine compound is thereby formed in the flue gas, and a mist containing the sulfide of the basic amine compound is collected by a demister. In this manner, the basic amine compound in the flue gas from the decarbonator is collected. However, when the basic amine compound must be reduced in amount in a more sophisticated manner, it is difficult, in view of the contact efficiency between the sulfuric acid and the basic amine compound and the generation efficiency of the sulfide of the basic amine compound, to control the amount of sprayed sulfuric acid relative to the amount of the basic amine compound necessary to be removed from the flue gas. Therefore, sulfuric acid must be sprayed in an amount greater than the equivalent amount of the basic amine compound. Moreover, in PTL 3, since sulfuric acid (a dilute aqueous sulfuric acid solution) is sprayed into the flue gas, the amount of mist in the flue gas is large, and the mist load on the demister is high. Therefore, a high-performance demister must be used, or the necessary capacity of the demister may be increased.

The present invention solves the foregoing problems, and it is an object of the invention to provide a $CO_2$ recovery system and a $CO_2$ recovery method that can further reduce the concentration of residual basic amine compounds emitted together with decarbonated flue gas.

Solution to Problem

According to an aspect of the present invention, a $CO_2$ recovery system includes: an absorber including a $CO_2$ absorbing section and at least one water-washing section, the $CO_2$ absorbing section allowing flue gas to comes into contact with a basic amine compound absorbent so that the basic amine compound absorbent absorbs $CO_2$ in the flue gas, the at least one water-washing section allowing the decarbonated flue gas in which an amount of $CO_2$ has been reduced in the $CO_2$ absorbing section to come into contact with wash water to reduce amounts of the basic amine compounds entrained in the decarbonated flue gas; a regenerator for releasing the $CO_2$ from the basic amine compound absorbent containing the $CO_2$ absorbed therein; and an absorbent-treating section disposed downstream of the at least one water-washing section through which the decarbonated flue gas flows, the absorbent-treating section allowing the decarbonated flue gas to come into contact with circulating acidic water to further reduce the amounts of the basic amine compounds entrained in the decarbonated flue gas.

In this $CO_2$ recovery system, even when the basic amine compounds remain in the decarbonated flue gas that has passed through the water-washing section, these basic amine compounds react with the acid in the acidic water and can be separated from the decarbonated flue gas. Therefore, the concentrations of the residual basic amine compounds emitted together with the decarbonated flue gas can be further reduced. In particular, in the $CO_2$ recovery system, the decarbonated flue gas is brought into contact with the circulating acidic water to dissolve the basic amine compounds in the acidic water. Therefore, the pH value of the acidic water can be easily adjusted in the range suitable for obtaining the salts of the basic amine compounds, and the amounts of the basic amine compounds remaining in the decarbonated flue gas can be efficiently reduced without using the acid in an amount exceeding the equivalent amount of the basic amine compounds.

Advantageously, the $CO_2$ recovery system further includes a control unit for adjusting a pH value of the acidic water to a desired value for obtaining salts of the basic amine compounds by contact with the decarbonated flue gas.

In this $CO_2$ recovery system, the basic amine compounds in the decarbonated flue gas can be appropriately dissolved in the acidic water as the salts thereof.

Advantageously, the $CO_2$ recovery system further includes: a sub-regenerator for adding basic sodium to the basic amine compound absorbent from the regenerator; and an acidic water discharge tube for supplying, to the sub-regenerator, part of the acidic water containing the basic amine compounds removed from the decarbonated flue gas.

In this $CO_2$ recovery system, basic sodium is added, in the sub-regenerator, to the acidic water containing the basic amine compounds to separate the basic amine compound absorbent from the salt of the acid and sodium. Therefore, the basic amine compound absorbent can be recycled to the absorber, and the salt of the acid and sodium can be removed from the system. In this case, the basic amine compounds are not released to the air and are returned to the system, and the consumption of the basic amine compounds can thereby be reduced.

Advantageously, the $CO_2$ recovery system further includes a concentrating unit for concentrating the acidic water containing the basic amine compounds before the acidic water is delivered to the sub-regenerator.

In this $CO_2$ recovery system, the amount of the acidic water delivered to the sub-regenerator can be reduced by concentrating the acidic water containing the basic amine compounds dissolved therein in the concentrating unit. This can facilitate the treatment in the sub-regenerator. In other words, since the volume of the acidic water supplied to the sub-regenerator is reduced, the sub-regenerator can be reduced in size, and the vapor consumption during sub-regeneration in the sub-regenerator can be reduced.

Advantageously, the $CO_2$ recovery system further includes a wastewater treatment unit for rendering harmless the acidic water containing the basic amine compounds removed from the decarbonated flue gas.

In this $CO_2$ recovery system, the acidic water containing the basic amine compounds is supplied to the wastewater treatment unit and then is rendered harmless. In this manner, the basic amine compounds can be appropriately rendered harmless, and basic substances, such as ammonia, other than the basic amine compounds can also be rendered harmless simultaneously.

Advantageously, the $CO_2$ recovery system further includes a concentrating unit for concentrating the acidic water containing the basic amine compounds before the acidic water is delivered to the wastewater treatment unit.

In this $CO_2$ recovery system, the acidic water containing the basic amine compounds dissolved therein is concentrated in the concentrating unit, and the amount of the acidic water delivered to the wastewater treatment unit can thereby be reduced. This can facilitate the treatment in the wastewater treatment unit. In other words, since the volume of the acidic water supplied to the wastewater treatment unit is reduced, the wastewater treatment unit can be reduced in size.

Advantageously, the $CO_2$ recovery system further includes a demister for collecting the acidic water in a mist form that is entrained in the decarbonated-deaminated flue gas in which the amounts of the basic amine compounds has been reduced.

In this $CO_2$ recovery system, the mist-like acidic water containing the basic amine compounds is prevented from being discharged together with the decarbonated flue gas.

Advantageously, in the $CO_2$ recovery system, condensed water generated when $CO_2$ gas recovered from the basic amine compound absorbent is cooled or condensed water generated when the flue gas to be supplied to the $CO_2$ absorbing section is cooled is supplied as replenishing water for the acidic water.

In this $CO_2$ recovery system, the condensed water generated in the $CO_2$ recovery system is utilized. Therefore, the basic amine compounds can be collected without replenishing water from the outside of the $CO_2$ recovery system.

Advantageously, the $CO_2$ recovery system further includes: a flue gas measuring unit for measuring a concentration of the basic amine compounds in the decarbonated-deaminated flue gas in which the amounts of the basic amine compounds have been reduced; and a control unit for adjusting a pH value of the acidic water or a flow rate of the acidic water on the basis of the concentration of the basic amine compounds measured by the flue gas measuring unit.

In this $CO_2$ recovery system, the pH value or the circulation flow rate can be adjusted to a value suitable for collecting the basic amine compounds according to the concentration of the basic amine compounds remaining in the decarbonated-deaminated flue gas discharged to the outside of the $CO_2$ recovery system (the absorber).

Advantageously, the $CO_2$ recovery system further includes a volatile organic compound removal unit for reducing amounts of volatile organic compounds entrained in the decarbonated flue gas together with the basic amine compounds by bringing the decarbonated flue gas into contact with the acidic water.

In this $CO_2$ recovery system, even when the volatile organic compounds remain in the decarbonated flue gas that has passed through the water-washing section, these volatile organic compounds together with the basic amine compounds are dissolved in the acidic water and are separated from the decarbonated flue gas. Therefore, the concentrations of the residual volatile organic compounds emitted together with the decarbonated flue gas can be further reduced.

Advantageously, the $CO_2$ recovery system further includes: a flue gas measuring unit for measuring a concentration of the volatile organic compounds in the decarbonated-deaminated flue gas in which the amounts of the volatile organic compounds and the amounts of the basic amine compounds have been reduced; and a control unit for adjusting a flow rate of the acidic water supplied to the volatile organic compound removal unit on the basis of the concentration of the volatile organic compounds measured by the flue gas measuring unit.

In this $CO_2$ recovery system, the flow rate of the acidic water supplied to the volatile organic compound-treating unit to collect the volatile organic compounds can be adjusted according to the concentration of the volatile organic compounds remaining in the decarbonated flue gas discharged to the outside of the $CO_2$ recovery system (the absorber).

According to another aspect of the present invention, a $CO_2$ recovery method includes the steps of: bringing flue gas into contact with a basic amine compound absorbent so that the basic amine compound absorbent absorbs $CO_2$ contained in the flue gas; bringing the decarbonated flue gas in which an amount of $CO_2$ has been reduced into contact with wash water to reduce amounts of basic amine compounds entrained in the decarbonated flue gas; releasing the $CO_2$ from the basic amine compound absorbent containing the $CO_2$ absorbed therein; and bringing circulating acidic water into contact with the decarbonated flue gas that has undergone the step of bringing the decarbonated flue gas into contact with the wash water to thereby further reduce the amounts of the basic amine compounds entrained in the decarbonated flue gas.

In this $CO_2$ recovery method, even when the basic amine compounds remain in the decarbonated flue gas that has undergone the step of bringing the decarbonated flue gas in which the amount of $CO_2$ has been reduced into contact the with wash water to reduce the amounts of the basic amine compounds entrained in the decarbonated flue gas, these basic amine compounds are reacted with the acidic water to separate them from the decarbonated flue gas. Therefore, the concentrations of the residual basic amine compounds emitted together with the decarbonated flue gas can be further reduced. In particular, in this $CO_2$ recovery method, the decarbonated flue gas is brought into contact with the circulating acidic water, so that the basic amine compounds are dissolved in the acidic water. Therefore, the pH value of the acidic water can be easily adjusted to a value in the range suitable for obtaining the salts of the basic amine compounds, and the amounts of the basic amine compounds remaining in the decarbonated flue gas can be efficiently reduced without using the acid in an amount exceeding the equivalent amount of the basic amine compounds.

Advantageously, in the $CO_2$ recovery method, the step of bringing the circulating acidic water into contact with the decarbonated flue gas includes the step of adjusting a pH value of the acidic water to a desired value for obtaining salts of the basic amine compounds by contact with the decarbonated flue gas.

In this $CO_2$ recovery method, the basic amine compounds in the decarbonated flue gas can be appropriately dissolved in the acidic water as the salts thereof.

Advantageously, in the $CO_2$ recovery method, the step of releasing the $CO_2$ from the basic amine compound absorbent includes the step of adding basic sodium to the basic amine compound absorbent, and part of the acidic water containing the basic amine compounds removed from the decarbonated flue gas is supplied to the step of adding basic sodium.

In this $CO_2$ recovery method, basic sodium is added to the acidic water containing the basic amine compounds to separate the basic amine compound absorbent from the salt of the acid and sodium. Therefore, the basic amine compound absorbent can be recycled to the absorber, and the salt of the acid and sodium can be removed from the system. In this case, the basic amine compounds are not released to the air and are returned to the system, and the consumption of the basic amine compounds can thereby be reduced.

Advantageously, the $CO_2$ recovery method further includes the step of concentrating the acidic water before the part of the acidic water containing the basic amine compounds removed from the decarbonated flue gas is supplied to the step of adding basic sodium.

In this $CO_2$ recovery method, before the part of the acidic water containing the basic amine compounds removed from the decarbonated flue gas is supplied to the step of adding basic sodium, the acidic water containing the basic amine compounds dissolved therein is concentrated, and the amount of the acidic water used for subsequent treatments can thereby be reduced. Therefore, the treatment for rendering the basic amine compounds harmless can be facilitated.

Advantageously, the $CO_2$ recovery method further includes, after the step of bringing the acidic water into contact with the decarbonated flue gas, the step of rendering harmless the acidic water containing the basic amine compounds removed from the decarbonated flue gas.

In this $CO_2$ recovery method, the acidic water containing the basic amine compounds is supplied to a wastewater treatment unit and is rendered harmless therein. In this manner, the basic amine compounds can be appropriately rendered harmless, and basic substances, such as ammonia, other than the basic amine compounds can also be rendered harmless simultaneously.

Advantageously, the $CO_2$ recovery method further includes the step of concentrating the acidic water before the step of rendering harmless the acidic water containing the basic amine compounds.

In this $CO_2$ recovery method, the acidic water containing the basic amine compounds dissolved therein is concentrated, and the amount of the acidic water supplied to the wastewater treatment unit can thereby be reduced. Therefore, the treatment in the wastewater treatment unit can be facilitated.

Advantageously, in the $CO_2$ recovery method, the step of bringing the acidic water into contact with the decarbonated flue gas includes the step of collecting the acidic water in a mist form that is entrained in the decarbonated-deaminated flue gas in which the amounts of the basic amine compounds have been reduced.

In this $CO_2$ recovery method, the mist-like acidic water containing the basic amine compounds is prevented from being discharged together with the decarbonated flue gas.

Advantageously, in the $CO_2$ recovery method, the step of bringing the acidic water into contact with the decarbonated flue gas includes the step of supplying, as replenishing water for the acidic water, condensed water generated when $CO_2$ gas recovered from the basic amine compound absorbent is cooled or condensed water that is used to cool the flue gas before $CO_2$ is absorbed thereinto.

In this $CO_2$ recovery method, the condensed water generated in the $CO_2$ recovery system is utilized. Therefore, the basic amine compounds can be collected without replenishing water from the outside of the $CO_2$ recovery system.

Advantageously, the $CO_2$ recovery method further includes the steps of: measuring a concentration of the basic amine compounds in the decarbonated-deaminated flue gas in which the amounts of the basic amine compounds have been reduced; and adjusting a pH value of the acidic water or a flow rate of the acidic water on the basis of the measured concentration of the basic amine compounds.

In this $CO_2$ recovery method, the pH value or the circulation flow rate can be adjusted to a value suitable for collecting the basic amine compounds according to the concentration of the basic amine compounds remaining in the decarbonated-deaminated flue gas discharged to the outside of the $CO_2$ recovery system (the absorber).

Advantageously, the $CO_2$ recovery method further includes the step of reducing amounts of volatile organic compounds entrained in the decarbonated flue gas together with the basic amine compounds by bringing the decarbonated flue gas into contact with the acidic water.

In this $CO_2$ recovery method, even when the volatile organic compounds remain in the decarbonated flue gas, these volatile organic compounds together with the basic amine compounds are dissolved in the acidic water and are separated from the decarbonated flue gas. Therefore, the concentrations of the residual volatile organic compounds emitted together with the decarbonated flue gas can be further reduced.

Advantageously, the $CO_2$ recovery method further includes the steps of: measuring a concentration of the volatile organic compounds in the decarbonated-deaminated flue gas in which the amounts of the volatile organic compounds and the amounts of the basic amine compounds have been reduced; and adjusting the flow rate of the acidic water supplied to the step of reducing the amounts of the volatile organic compounds on the basis of the measured concentration of the volatile organic compounds.

In this $CO_2$ recovery method, the flow rate of the acidic water supplied to a volatile organic compound-treating unit to collect the volatile organic compounds can be adjusted according to the concentration of the volatile organic compounds remaining in the decarbonated flue gas discharged to the outside of the $CO_2$ recovery system (the absorber).

Advantageous Effects of Invention

According to the present invention, the concentrations of the residual basic amine compounds emitted together with the decarbonated flue gas can be further reduced.

BRIEF DESCRIPTION OF DRAWINGS

FIG. 6 is a table showing the test results indicating the concentrations of basic amine compounds and volatile organic compounds remaining in decarbonated flue gas in $CO_2$ recovery systems used in Examples of the present invention.

DESCRIPTION OF EMBODIMENTS

Hereinafter, embodiments of the present invention will be described in detail with reference to the drawings. However, the present invention is not limited to the embodiments. Components in the following embodiments include those which can be easily replaced by persons skilled in the art and also include substantially equivalent components.

First Embodiment

Figure 1:
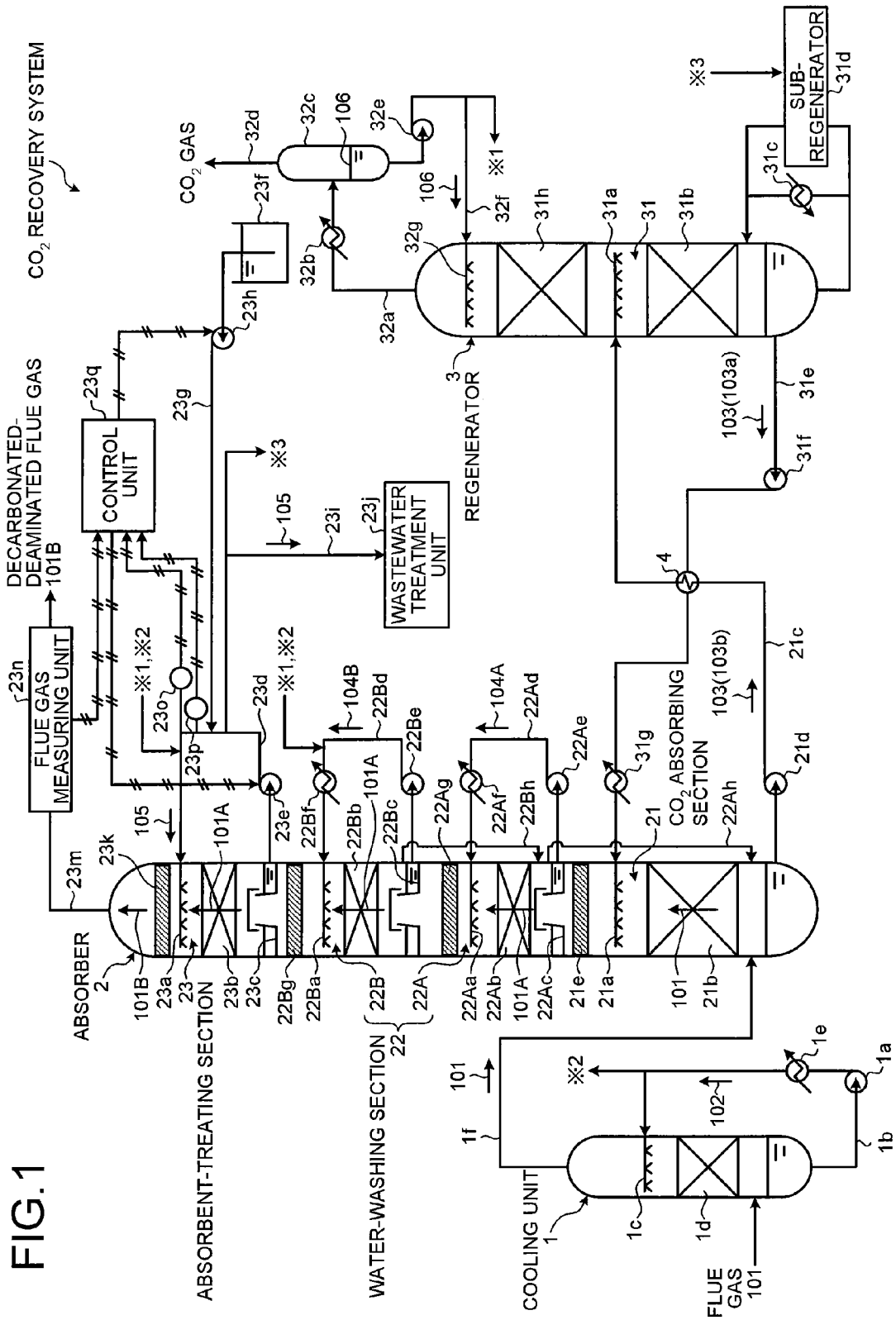
FIG. 1 is a schematic diagram of a $CO_2$ recovery system according to a first embodiment of the present invention.

A first embodiment will be described with reference to the drawings. FIG. 1 is a schematic diagram of a $CO_2$ recovery system according to the first embodiment.

As shown in FIG. 1, this $CO_2$ recovery system includes a cooling unit 1, an absorber 2, and a regenerator 3. The cooling unit 1 cools flue gas 101 discharged from an industrial facility (not shown) such as a boiler with cooling water 102. The absorber 2 allows a lean solution 103a of a basic amine compound absorbent 103, which is an aqueous solution of a basic amine compound that absorbs $CO_2$, to come into countercurrent contact with the flue gas 101 so that the basic amine compound absorbent 103 absorbs $CO_2$ in the flue gas 101. The flue gas 101 in which the amount of $CO_2$ has been reduced is discharged from the absorber 2. The regenerator 3 releases $CO_2$ from a rich solution 103b of the basic amine compound absorbent 103 that contains the $CO_2$ absorbed therein, so that the lean solution 103a is regenerated.

The flue gas 101 containing $CO_2$ is increased in pressure by a flow gas blower (not shown) and is delivered inside the cooling unit 1. In the cooling unit 1, the flue gas 101 comes into countercurrent contact with the cooling water 102 and is thereby cooled.

The cooling water 102 is accumulated in the lower portion of the cooling unit 1, and is supplied by a cooling water circulation pump 1a to the upper portion of the cooling unit 1 through a cooling water tube 1b disposed outside the cooling unit 1. Then the cooling water 102 flows downward from nozzles 1c disposed in the upper portion of the cooling unit 1 while the cooling water 102 comes into countercurrent contact with the rising flue gas 101 at the position of a packed bed 1d disposed between the nozzles 1c and the lower portion of the cooling unit 1. The cooling water tube 1b is provided with a cooling unit 1e. The cooling water 102 is thereby cooled to a temperature lower than the temperature of the flue gas 101, so that part of water in the flue gas 101 is condensed in the cooling unit 1 to form condensed water. The flue gas 101 cooled in the cooling unit 1 is discharged from the cooling unit 1 through a flue gas tube 1f and is then supplied to the absorber 2.

The absorber 2 includes a $CO_2$ absorbing section 21 disposed in the lower portion thereof, a water-washing section 22 disposed in the central portion, and an absorbent-treating section 23 disposed in the upper portion. In the $CO_2$ absorbing section 21, the flue gas 101 supplied from the cooling unit 1 comes into countercurrent contact with the lean solution 103a of the basic amine compound absorbent 103, so that the basic amine compound absorbent 103 absorbs $CO_2$ in the flue gas 101.

The lean solution 103a of the basic amine compound absorbent 103 is supplied from the regenerator 3 and flows downward from nozzles 21a. After coming into countercurrent contact with the rising flue gas 101 at the position of a packed bed 21b disposed between the nozzles 21a and the lower portion of the absorber 2, the lean solution 103a becomes the rich solution 103b containing $CO_2$ absorbed therein, and the rich solution 103b is accumulated in the bottom portion of the absorber 2. The rich solution 103b of the basic amine compound absorbent 103 accumulated in the bottom portion of the absorber 2 is pumped by a rich-solution discharge pump 21d disposed in a rich-solution tube 21c disposed outside the absorber 2 and is then supplied to the regenerator 3. The decarbonated flue gas 101A in which the amount of $CO_2$ has been reduced flows upward and passes through a demister 21e, and the basic amine compound absorbent 103 in a mist form that is entrained in the decarbonated flue gas 101A is thereby collected.

In the present embodiment, the water-washing section 22 includes a first water-washing section 22A and a second water-washing section 22B that are arranged vertically. The lower first water-washing section 22A allows the decarbonated flue gas 101A in which the amount of $CO_2$ has been reduced in the $CO_2$ absorbing section 21 to come into countercurrent contact with wash water 104A, so that basic amine compounds entrained in the decarbonated flue gas 101A are reduced in amount through the wash water 104A.

The wash water 104A flows downward from nozzles 22Aa, while the wash water 104A comes into countercurrent contact with the rising decarbonated flue gas 101A at the position of a packed bed 22Ab disposed between the nozzles 22Aa and a water receiver 22Ac. Then, the wash water 104A is accumulated in the water receiver 22Ac. The wash water 104A accumulated in the water receiver 22Ac is pumped and circulated by a wash water circulation pump 22Ae disposed in a wash water tube 22Ad disposed outside the absorber 2, while the wash water 104A is cooled by a cooling unit 22Af, and again flows downward from the nozzles 22Aa. More specifically, the wash water 104A is circulated and comes into countercurrent contact with the decarbonated flue gas 101A so that the basic amine compounds in the decarbonated flue gas 101A are reduced in amount. After the basic amine compounds are reduced in amount through the wash water 104A, the decarbonated flue gas 101A further flows upward and passes through a demister 22Ag, and the wash water 104A in a mist form that is entrained in the decarbonated flue gas 101A is thereby collected. The basic amine compounds include, in addition to the basic amine compound used as absorbent, low-molecular weight basic amine compounds generated through decomposition.

The upper second water-washing section 22B allows the rising decarbonated flue gas 101A that has passed through the first water-washing section 22A to come into countercurrent contact with wash water 104B so that the basic amine compounds entrained in the decarbonated flue gas 101A are further reduced in amount through the wash water 104B.

The wash water 104B flows downward from nozzles 22Ba, while the wash water 104B comes into countercurrent contact with the rising decarbonated flue gas 101A at the position of a packed bed 22Bb disposed between the nozzles 22Ba and a water receiver 22Bc. Then, the wash water 104B is accumulated in the water receiver 22Bc. The wash water 104B accumulated in the water receiver 22Bc is pumped and circulated by a wash water circulation pump 22Be disposed in a wash water tube 22Bd disposed outside the absorber 2, while the wash water 104B is cooled by a cooling unit 22Bf, and again flows downward from the nozzles 22Ba. More specifically, the wash water 104B is circulated and comes into countercurrent contact with the decarbonated flue gas 101A so that the basic amine compounds in the decarbonated flue gas 101A are reduced in amount. After the basic amine compounds are reduced in amount through the wash water 104B, the decarbonated flue gas 101A further flows upward and passes through a demister 22Bg, and the wash water 104B in a mist form that is entrained in the decarbonated flue gas 101A is thereby collected.

In the second water-washing section 22B, part of condensed water (*1) generated when the $CO_2$ gas separated from the basic amine compound absorbent 103 in the regenerator 3 is cooled or part of condensed water (*2) generated when the flue gas 101 is cooled in the cooling unit 1 is supplied as the wash water 104B to the wash water tube 22Bd at a position upstream of the cooling unit 22Bf. The wash water 104B spilled over the water receiver 22Bc of the second water-washing section 22B is discharged to an overflow tube 22Bh disposed outside the absorber 2 and then supplied to the water receiver 22Ac of the first water-washing section 22A. The wash water 104A spilled over the water receiver 22Ac of the first water-washing section 22A is discharged to an overflow tube 22Ah disposed outside the absorber 2 and is then supplied to the bottom of the $CO_2$ absorbing section 21. The water-washing section 22 may include only one section or may include two or more sections.

In the absorbent-treating section 23, the decarbonated flue gas 101A that has passed through the water-washing sections 22 (22A and 22B) comes into countercurrent contact with acidic water 105. The basic amine compounds remaining in the decarbonated flue gas 101A are thereby reacted with the acid in the acidic water 105 to form salts of the basic amine compounds. The formed salts are dissolved in the acidic water 105 and are thereby separated from the decarbonated flue gas 101A. Part of the acidic water 105 (*3) containing the basic amine compounds dissolved therein is supplied to a sub-regenerator 31d. In the sub-regenerator 31d, basic sodium is added to the acidic water 105 containing the basic amine compounds to separate the basic amine compound absorbent from the salt of the acid and sodium. In this manner, the basic amine compound absorbent can be recycled to the absorber 2, and the salt of the acid and sodium can be removed from the system. When sulfuric acid, for example, is used as the acid, the basic amine compound absorbent and sodium sulfate are mainly generated in the sub-regenerator 31d. Part of the acidic water 105 containing the basic amine compounds dissolved therein may be supplied to a wastewater treatment unit 23j so that the basic amine compounds are rendered harmless, and the treated basic amine compounds may be discharged to the outside of the $CO_2$ recovery system.

The acidic water 105 flows downward from nozzles 23a while the acidic water 105 comes into countercurrent contact with the rising decarbonated flue gas 101A at the position of a packed bed 23b disposed between the nozzles 23a and a water receiver 23c. Thereby, the acidic water 105 dissolves the basic amine compounds, and the resultant acidic water 105 is accumulated in the water receiver 23c. The acidic water 105 accumulated in the water receiver 23c is pumped and circulated by an acidic water circulation pump 23e disposed in an acidic water tube 23d disposed outside the absorber 2 and again flows downward from the nozzles 23a. More specifically, the acidic water 105 passes through a water circulation unit composed of the nozzles 23a, the interior of the absorber 2, the packed bed 23b, the water receiver 23c, the acidic water tube 23d, and the acidic water circulation pump 23e so as to form a path that allows the acidic water 105 to circulate in the path and to come into countercurrent contact with the decarbonated flue gas 101A. An acidic water discharge tube 23i for extracting part of the circulating acidic water 105 is connected to the acidic water tube 23d. The acidic water discharge tube 23i is branched into two tubes. One of the branched tubes is connected to the sub-regenerator 31d, and the other branched tube is connected to the wastewater treatment unit 23j. More specifically, part of the circulating acidic water 105 is supplied to the sub-regenerator 31d and the wastewater treatment unit 23j.

Since part of the acidic water 105 is extracted to the sub-regenerator 31d and the wastewater treatment unit 23j, a liquid (replenishing water) must be replenished. Preferably, the condensed water (*1) generated when the $CO_2$ gas separated from the basic amine compound absorbent 103 in the regenerator 3 is cooled or the condensed water (*2) generated when the flue gas 101 is cooled in the cooling unit 1 is used as the replenishing water. In this manner, the basic amine compounds can be collected without replenishing water from the outside of the $CO_2$ recovery system.

The acid in the acidic water 105 is supplied from an acid supply unit composed of an acid tank 23f containing an aqueous acid solution stored therein, an aqueous acid solution tube 23g, and an aqueous acid solution pump 23h. The acid is supplied such that the pH of the acidic water 105 is measured and then adjusted to a value that gives the salts of the basic amine compounds. More specifically, the amount of the acid supplied is adjusted such that the pH of the acidic water is 4.0 to 6.5. Examples of the aqueous acid solution include diluted sulfuric acid, boric acid, oxalic acid, carbonic acid, and hydrochloric acid.

The decarbonated-deaminated flue gas 101B from which the basic amine compound absorbent 103 has been recovered further flows upward and passes through a demister 23k, and the basic amine-containing acidic water (acidic water containing the basic amine compounds dissolved therein) 105 in a mist form that is entrained in the decarbonated-deaminated flue gas 101B is thereby collected. Then the flue gas 101B is discharged from a flue gas discharge tube 23m disposed outside the absorber 2.

The wastewater delivered to the wastewater treatment unit 23j is acidic water containing basic amines. Since the wastewater contains N (nitrogen) and COD at high concentrations, it must be rendered harmless. Examples of the method of rendering the waste water harmless include biological treatment, catalytic oxidation, and waste liquid combustion. With the biological treatment method, organic nitrogen (basic amine) can be transformed mainly to nitrogen gas at room temperature and normal pressure. However, the installation area of the biological treatment facility is large. In addition, since sludge is generated as a by-product, sludge treatment is required.

With the catalytic oxidation method, organic nitrogen (basic amine) can be decomposed into nitrogen gas and water under high-temperature and high-pressure conditions. In addition, the catalytic oxidation method has advantages in that the installation area of its facility is small and that no by-product is generated. However, it is difficult to completely decompose a basic amine compound, so that part of the basic amine compound may remain undecomposed.

In the waste liquid combustion method, the wastewater is sprayed and combusted together with auxiliary fuel under high-temperature conditions. This method is suitable for treating high-COD wastewater containing large amounts of organic components. More specifically, high-temperature combustion product gas produced by combustion of the auxiliary fuel in a combustor is blown into a furnace, and acidic water 105 containing basic amine compounds dissolved therein is sprayed into the furnace. In this manner, C (carbon) in the organic materials is decomposed into $CO_2$ (carbon dioxide) at high temperature; H (hydrogen) in the organic materials is decomposed into $H_2O$ (water); and salt contents are transformed into dust. The dust is collected in a downstream water-absorption facility, dissolved in water, neutralized, and then released.

The absorbent-treating section 23 is provided with a flue gas measuring unit 23n for measuring the concentration of the basic amine compounds in the decarbonated-deaminated flue gas 101B. The flu gas measuring unit 23h is disposed in the flue gas discharge tube 23m from which the decarbonated-deaminated flue gas 101B is discharged from the absorber 2 to the outside of the $CO_2$ recovery system. The absorbent-treating section 23 is further provided with a pH measuring unit 23o for measuring the pH value of the acidic water 105. The pH measuring unit 23o is disposed in the acidic water tube 23d through which the acidic water 105 is circulated. The absorbent-treating section 23 is further provided with a flow rate measuring unit 23p for measuring the flow rate of the acidic water 105. The flow rate measuring unit 23p is disposed in the acidic water tube 23d through which the acidic water 105 is circulated. The flue gas measuring unit 23n, the pH measuring unit 23o, the flow rate measuring unit 23p, the aqueous acid solution pump 23h, and the acidic water circulation pump 23e are connected to a control unit 23q.

Any of a total hydrocarbon concentration meter, an alkali concentration meter, and a meter for measuring the total nitrogen concentration in gas can be used as the flue gas measuring unit 23n. The total hydrocarbon concentration meter can measure a concentration by introducing sample gas into a hydrogen flame ionization detector. More specifically, after methane is separated from the sample gas in a gas chromatography column, this sample gas is introduced into the hydrogen flame ionization detector to measure the concentration of non-methane hydrocarbons. With the total hydrocarbon concentration meter, the concentrations of the amine compounds and volatile organic compounds (such as aldehydes) can be mainly measured.

In the alkali concentration meter, an absorbent ($H_2SO_4$ (sulfuric acid), $H_3BO_4$ (boric acid)) is placed in a container, and a predetermined amount of sample gas is caused to pass through the absorbent so that the absorbent absorbs alkali components contained in the sample gas. Then the resultant absorbent is neutralized by titration with a NaOH (sodium hydroxide) normal solution to determine the alkali content. With the alkali concentration meter, the concentrations of the amine compounds and decomposed products thereof (such as ammonia) can be mainly measured.

In the meter for measuring the total nitrogen concentration in gas, sample gas is introduced into an oxidation catalyst layer to oxidize all the basic amine compounds to NO (nitrogen monoxide) or $NO_2$ (nitrogen dioxide). The obtained NO and $NO_2$ are introduced into a converter to convert $NO_2$ into NO, and the total nitrogen concentration ($NO+NO_2$) is detected by a detector (by chemiluminescence method). Separately, the sample gas that is not caused to pass through the oxidation catalyst layer is directly introduced into the convertor to convert $NO_2$ into NO, and the total nitrogen concentration is detected by the detector (by chemiluminescence method). The total nitrogen concentration of the sample gas not introduced into the oxidation catalyst layer is subtracted from the total nitrogen concentration of the sample gas introduced into the oxidation catalyst layer, thereby the concentration of nitrogen originating from the basic amines can be measured.

The control unit 23q is composed of, for example, a microcomputer and includes a storage unit (not shown) composed of a RAM, a ROM, etc. in which programs and data are stored. The storage unit includes stored therein flow rate data for the acidic water circulation pump 23e. This flow rate data is used to determine the circulation flow rate of the acidic water 105 so that the basic amine compounds contained in the gas are dissolved in the acidic water 105 as the salts thereof. The storage unit also includes stored therein other flow rate data for the acidic water circulation pump 23e. This flow rate data is used to determine, on the basis of the concentration of the basic amine compounds remaining in the decarbonated-deaminated flue gas 101B, the desired pH value or the circulation flow rate of the acidic water 105. The desired pH value is determined such that the basic amine compounds contained in the gas are dissolved in the acidic water 105 as the salts. The circulation flow rate is determined such that the removal ratio of the basic amine compounds from the flue gas 101B becomes a desired value. The control unit 23q controls the supply flow rate of the aqueous acid solution pump 23h on the basis of the concentration measured by the flue gas measuring unit 23n and according to the programs and data stored in the storage unit in advance. This supply flow rate is used in the mode wherein the pH value of the acidic water 105 is adjusted to the desired value for forming the salts of the basic amine compounds. Alternatively, the control unit 23q controls the supply flow rate of the acidic water circulation pump 23e on the basis of the concentration measured by the flue gas measuring unit 23n and according to the programs and data stored in the storage unit in advance. This supply flow rate is used in the mode wherein the desired removal ratio of the basic amine compounds is obtained.

The regenerator 3 includes an absorbent regenerating unit 31 disposed in the lower half thereof. In the absorbent regenerating unit 31, $CO_2$ is recovered from the rich solution 103b to regenerate the basic amine compound absorbent 103 as the lean solution 103a, thereby releasing $CO_2$ from the basic amine compound absorbent 103 containing the $CO_2$ absorbed therein.

The rich solution 103b of the basic amine compound absorbent 103 is supplied from the rich-solution tube 21c of the $CO_2$ absorbing section 21 in the absorber 2 and flows downward from nozzles 31a. Then the rich solution 103b passes through a lower packed bed 31b disposed between the nozzles 31a and the lower portion of the regenerator 3 and is thereby converted to the lean solution 103a from which substantially the entire amount of $CO_2$ has been released through endothermic reaction caused by a regenerating heater 31c connected to the lower portion of the regenerator 3. The resulting lean solution 103a is accumulated in the bottom portion of the regenerator 3. The sub-regenerator 31d is connected to the lower portion of the regenerator 3. In the sub-regenerator 31d, part of the lean solution 103a is heated. Therefore, degraded products, and the like are concentrated and collected as sludge, and the generated vapor is returned to the lower portion of the regenerator 3. The lean solution 103a accumulated in the lower portion of the regenerator 3 is pumped by a lean solution discharge pump 31f disposed in a lean solution tube 31e and is supplied to the absorber 2. During this process, the lean solution 103a is heat-exchanged in a rich-lean heat exchanger 4 with the rich solution 103b supplied to the regenerator 3 through the rich-solution tube 21c and is cooled in a cooling unit 31g.

The released $CO_2$ flows upward in the regenerator 3, passes through an upper packed bed 31h, and is discharged from the top portion of the regenerator 3. Since the discharged $CO_2$ contains water, it is cooled in a condenser 32b disposed in a $CO_2$ discharge line 32a. The water contained in the $CO_2$ is thereby condensed, and the condensed water 106 is separated from $CO_2$ in a $CO_2$ separator 32c. The high-purity $CO_2$ separated from the condensed water 106 is emitted to the outside of the decarbonation system through a $CO_2$ emission line 32d and is used or disposed of in the subsequent process. The condensed water 106 is delivered by a condensed water pump 32e, and part of the condensed water 106 is supplied to the regenerator 3 from nozzles 32g disposed in the top portion of the regenerator 3 through a regenerator reflux water line 32f. The condensed water 106 has a very low amine concentration and therefore can be used as the replenishing water for the absorbent-treating section 23 and the water-washing section 22.

As described above, the $CO_2$ recovery system of the first embodiment includes the absorber 2 and the regenerator 3. The absorber 2 includes the $CO_2$ absorbing section 21 and at least one water-washing section 22 (22A, 22B). The $CO_2$ absorbing section 21 allows the flue gas 101 to come into contact with the basic amine compound absorbent 103, so that the basic amine compound absorbent 103 absorbs $CO_2$ in the flue gas 101. The at least one water-washing section 22 (22A, 22B) allows the decarbonated flue gas 101A in which the amount of $CO_2$ has been reduced in the $CO_2$ absorbing section 21 to come into contact with the wash water 104A and 104B to reduce the amounts of the basic amine compounds entrained in the decarbonated flue gas 101A. The regenerator 3 releases $CO_2$ absorbed in the basic amine compound absorbent 103. This $CO_2$ recovery system further includes the absorbent-treating section 23 disposed downstream of the water-washing section 22 thorough which the decarbonated flue gas flows. The absorbent-treating section 23 allows the decarbonated flue gas 101A to come into contact with the circulating acidic water 105 to further reduce the amounts of the basic amine compounds entrained in the decarbonated flue gas 101A.

In this $CO_2$ recovery system, even when the basic amine compounds remain in the decarbonated flue gas 101A that has passed through the water-washing section 22, these basic amine compounds react with the acid in the acidic water 105 and are separated from the decarbonated flue gas 101A. Therefore, the concentrations of the residual basic amine compounds emitted together with the decarbonated flue gas 101A can be further reduced.

In particular, in the $CO_2$ recovery system, the decarbonated flue gas 101A is brought into contact with the circulating acidic water 105 to dissolve the basic amine compounds in the acidic water 105. Therefore, the pH value of the acidic water 105 can be easily adjusted in the range suitable for obtaining the salts of the basic amine compounds, and the amounts of the basic amine compounds remaining in the decarbonated flue gas can be efficiently reduced without using the acid in an amount exceeding the equivalent amount of the basic amine compounds.

The $CO_2$ recovery system of the first embodiment further includes the control unit 23q for adjusting the pH value of the acidic water 105 to the desired value for obtaining the salts of the basic amine compounds by contact with the decarbonated flue gas 101A.

The control unit 23q controls the acidic water circulation pump 23e to adjust the flow rate of the acidic water 105 that circulates through the acidic water tube 23d. Therefore, the pH value measured by the pH measuring unit 23o is adjusted to the desired pH value. The basic amine compounds in the decarbonated flue gas 101A can thereby be dissolved appropriately in the acidic water 105 as the salts thereof.

The $CO_2$ recovery system of the first embodiment further includes the sub-regenerator 31d in which basic sodium is added to the basic amine compound absorbent 103 from the regenerator 3. The acidic water discharge tube 23i is provided to supply, to the sub-regenerator 31d, part of the acidic water 105 containing the basic amine compounds removed from the decarbonated flue gas 101A.

In this $CO_2$ recovery system, basic sodium is added, in the sub-regenerator 31d, to the acidic water 105 containing the basic amine compounds to separate the basic amine compound absorbent from the salt of the acid and sodium. Therefore, the basic amine compound absorbent can be recycled to the absorber 2, and the salt of the acid and sodium can be removed from the system. In this case, the basic amine compounds are not released to the air and are returned to the system, and the consumption of the basic amine compounds can thereby be reduced.

The $CO_2$ recovery system of the first embodiment further includes the wastewater treatment unit 23j for rendering harmless the acidic water 105 containing the basic amine compounds removed from the decarbonated flue gas 101A.

In this $CO_2$ recovery system, the acidic water containing the basic amine compounds is supplied to the wastewater treatment unit and is then rendered harmless. In this manner, the basic amine compounds can be appropriately rendered harmless, and basic substances, such as ammonia, other than the basic amine compounds can also be rendered harmless simultaneously.

The $CO_2$ recovery system of the first embodiment further includes the demister for collecting the acidic water 105 in a mist form that is entrained in the decarbonated flue gas 101A from which the basic amine compounds have been separated.

In this $CO_2$ recovery system, the mist-like acidic water 105 containing the basic amine compounds is prevented from being discharged together with the decarbonated flue gas 101A.

In the $CO_2$ recovery system of the first embodiment, the condensed water 106 generated when the $CO_2$ gas recovered from the basic amine compound absorbent 103 is cooled or the cooling water (condensed water) 102 for cooling the flue gas 101 to be supplied to the $CO_2$ absorbing section 21 is used as the replenishing water for the acidic water 105 and is supplied as the circulation water circulated in the water circulation unit.

In this $CO_2$ recovery system, the condensed water generated in the $CO_2$ recovery system is utilized. Therefore, the basic amine compounds can be collected without replenishing water from the outside of the $CO_2$ recovery system.

The $CO_2$ recovery system of the first embodiment further includes: the flue gas measuring unit 23n for measuring the concentration of the basic amine compounds in the decarbonated-deaminated flue gas 101B in which the amounts of the basic amine compounds have been reduced; and the control unit for adjusting the pH value of the acidic water 105 or the flow rate of the acidic water 105 on the basis of the concentration of the basic amine compounds measured by the flue gas measuring unit 23n.

In this $CO_2$ recovery system, the pH value or the circulation flow rate can be adjusted to a value suitable for collecting the basic amine compounds according to the concentration of the basic amine compounds remaining in the decarbonated-deaminated flue gas 101B discharged to the outside of the $CO_2$ recovery system (the absorber 2).

A $CO_2$ recovery method of the first embodiment includes the steps of: bringing the flue gas 101 into contact with the basic amine compound absorbent 103 so that the basic amine compound absorbent 103 absorbs $CO_2$ contained in the flue gas 101; bringing the decarbonated flue gas 101A in which the amount of $CO_2$ has been reduced into contact with the wash water 104A and 104B to reduce the amounts of the basic amine compounds entrained in the decarbonated flue gas 101A; and releasing the $CO_2$ from the basic amine compound absorbent 103 containing the $CO_2$ absorbed therein. This $CO_2$ recovery method further includes the step of bringing the circulating acidic water 105 into contact with the decarbonated flue gas 101A that has undergone the step of bringing the decarbonated flue gas 101A into contact with the wash water 104A and 104B to further reduce the amounts of the basic amine compounds entrained in the decarbonated flue gas 101A.

In this $CO_2$ recovery method, even when the basic amine compounds remain in the decarbonated flue gas 101A that has undergone the step of bringing the decarbonated flue gas 101A in which the amount of $CO_2$ has been reduced into contact with the wash water 104A and 104B to reduce the amounts of the basic amine compounds entrained in the decarbonated flue gas 101A, since these basic amine compounds are reacted with the acidic water 105 to separate them from the decarbonated flue gas 101A, the concentrations of the residual basic amine compounds discharged together with the decarbonated flue gas 101A can be further reduced.

In particular, in this $CO_2$ recovery method, the decarbonated flue gas 101A is brought into contact with the circulating acidic water 105, so that the basic amine compounds are dissolved in the acidic water 105. Therefore, the pH value of the acidic water 105 can be easily adjusted to a value in the range suitable for obtaining the salts of the basic amine compounds, and the amounts of the basic amine compounds remaining in the decarbonated flue gas can be efficiently reduced without using the acid in an amount exceeding the equivalent amount of the basic amine compounds.

In the $CO_2$ recovery method of the first embodiment, the step of bringing the acidic water into contact with the decarbonated flue gas 101A further includes the step of adjusting the pH value of the acidic water to the desired value for obtaining the salts of the basic amine compounds by contact with the decarbonated flue gas.

In the step of adjusting the pH value of the acidic water to the desired value for obtaining the salts of the basic amine compounds by contact with the decarbonated flue gas, the flow rate of the circulating acidic water 105 is adjusted. Therefore, the basic amine compounds in the decarbonated flue gas 101A can be appropriately dissolved in the acidic water 105 as the salts thereof.

In the $CO_2$ recovery method of the first embodiment, the step of releasing the $CO_2$ from the basic amine compound absorbent 103 includes the step of adding basic sodium to the basic amine compound absorbent 103 and further includes the step of supplying, to the step of adding basic sodium, part of the acidic water 105 containing the basic amine compounds removed from the decarbonated flue gas 101A.

In this $CO_2$ recovery method, basic sodium is added to the acidic water 105 containing the basic amine compounds to separate the basic amine compound absorbent 103 from the salt of the acid and sodium. Therefore, the basic amine compound absorbent 103 can be recycled to the absorber 2, and the salt of the acid and sodium can be removed from the system. In this case, the basic amine compounds are not released to the air and are returned to the system, and the consumption of the basic amine compounds can thereby be reduced.

The $CO_2$ recovery method of the first embodiment further includes, after the step of bringing the acidic water 105 into contact with the decarbonated flue gas 101A, the step of rendering harmless the acidic water 105 containing the basic amine compounds removed from the decarbonated flue gas 101A.

In this $CO_2$ recovery method, the acidic water containing the basic amine compounds is supplied to the wastewater treatment unit and is rendered harmless therein. In this manner, the basic amine compounds can be appropriately rendered harmless, and basic substances, such as ammonia, other than the basic amine compounds can also be rendered harmless simultaneously.

In the $CO_2$ recovery method of the first embodiment, the step of bringing the acidic water 105 into contact with the decarbonated flue gas 101A further includes the step of collecting the acidic water 105 in a mist form that is entrained in the decarbonated-deaminated flue gas 101B in which the amounts of the basic amine compounds have been reduced.

In this $CO_2$ recovery method, the mist-like acidic water 105 containing the basic amine compounds can be prevented from being discharged together with the decarbonated flue gas 101B.

In the $CO_2$ recovery method of the first embodiment, the step of bringing the acidic water 105 into contact with the decarbonated flue gas 101A further includes the step of supplying, as replenishing water for the acidic water 105, the condensed water 106 generated when $CO_2$ gas recovered from the basic amine compound absorbent 103 is cooled or the cooling water (condensed water) 102 that is used to cool the flue gas 101 before $CO_2$ is absorbed thereinto.

In this $CO_2$ recovery method, the condensed water generated in the $CO_2$ recovery system is utilized. Therefore, the basic amine compounds can be collected without replenishing water from the outside of the $CO_2$ recovery system.

The $CO_2$ recovery method of the first embodiment further includes the steps of: measuring the concentration of the basic amine compounds in the decarbonated-deaminated flue gas 101B in which the amounts of the basic amine compounds are reduced; and adjusting the pH value of the acidic water 105 or the flow rate of the acidic water 105 on the basis of the measured concentration of the basic amine compounds.

In this $CO_2$ recovery method, the pH value or the circulation flow rate can be adjusted to a value suitable for collecting the basic amine compounds according to the concentration of the basic amine compounds remaining in the decarbonated-deaminated flue gas 101B discharged to the outside of the $CO_2$ recovery system.

Second Embodiment

Figure 2:
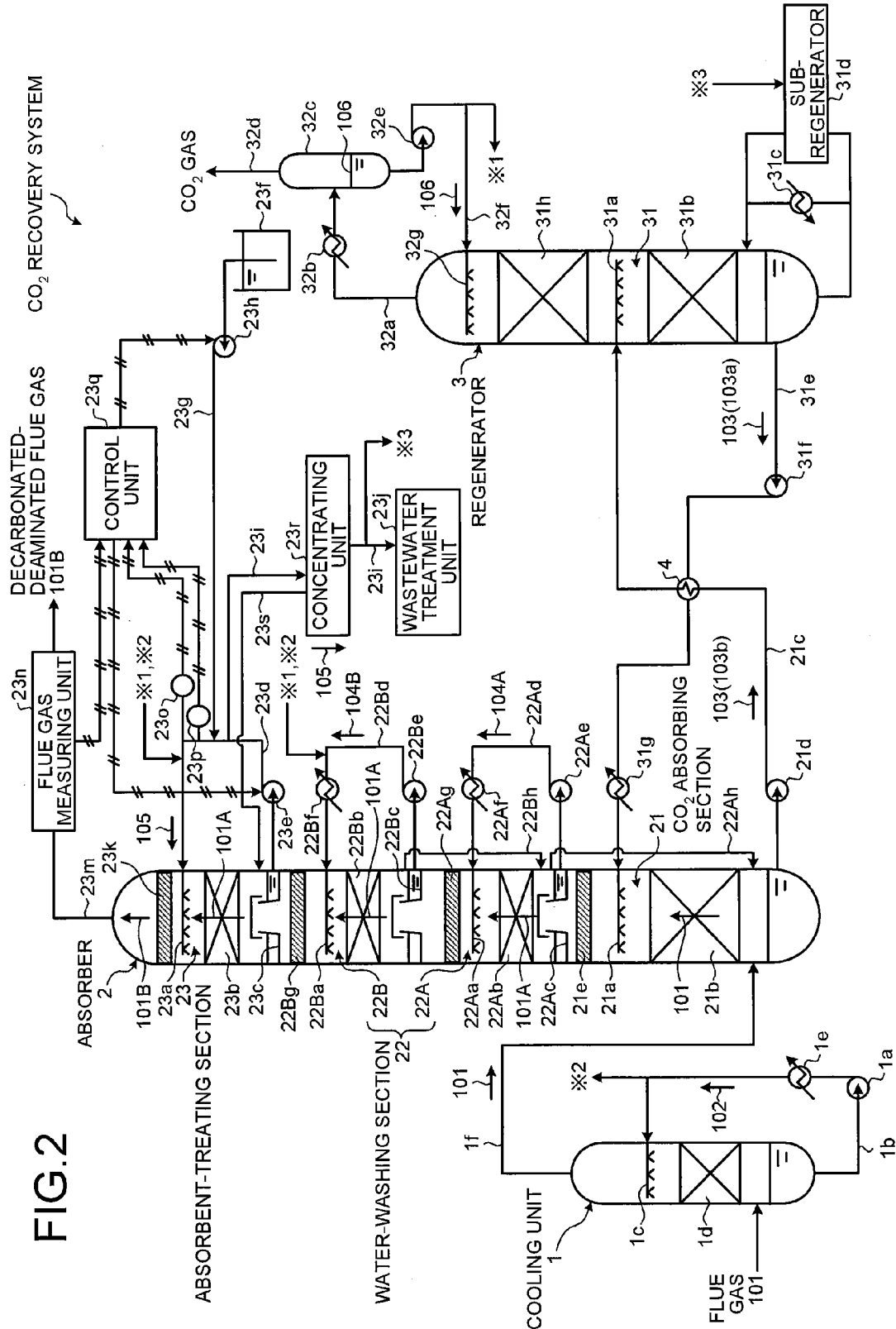
FIG. 2 is a schematic diagram of a $CO_2$ recovery system according to a second embodiment of the present invention.

A second embodiment will be described with reference to the drawing. FIG. 2 is a schematic diagram of a $CO_2$ recovery system according to the second embodiment.

As shown in FIG. 2, the $CO_2$ recovery system of the second embodiment includes, in addition to the components in the first embodiment described above, a concentrating unit 23r. The other components of the $CO_2$ recovery system of the second embodiment are the same as those of the $CO_2$ recovery system of the first embodiment. Therefore, the same components are designated by the same reference numerals, and their description will be omitted.

The concentrating unit 23r is disposed in the acidic water discharge tube 23i for supplying the acidic water 105 from the acidic water tube 23d of the water circulation unit in the absorbent-treating section 23 to the wastewater treatment unit 23j. The concentrating unit 23r concentrates the acidic water 105 to be delivered to the sub-regenerator 31d or the wastewater treatment unit 23j.

The concentrating unit 23r may be a multiple-effect evaporator or a vapor compression condenser. The multiple-effect evaporator includes a plurality of evaporators. The acidic water 105 is accumulated in a first one of the evaporators and is then heated and evaporated. The concentrated acidic water 105 is supplied to the next evaporator, and the generated vapor is used as the heat source for the next evaporator.

In the vapor compression condenser, vapor generated in an evaporator is pressurized by a compressor to increase the temperature and is used as a heat source for heating. With the vapor compression condenser, the power consumption during concentration can be reduced.

The acidic water 105 concentrated in the concentrating unit 23r is supplied through the acidic water discharge tube 23i to the sub-regenerator 31d or the wastewater treatment unit 23j. Vapor generated during concentration of the acidic water 105 is cooled to form condensed water, and the condensed water is supplied to the water receiver 23c of the water circulation unit through a water return tube 23s.

In contrast to the $CO_2$ recovery system of the first embodiment described above, the $CO_2$ recovery system of the second embodiment includes the concentrating unit 23r that concentrates the acidic water 105 containing the basic amine compounds before the acidic water 105 is delivered to the sub-regenerator 31d or the wastewater treatment unit 23j.

The advantageous effects of the $CO_2$ recovery system of the first embodiment described above are also achieved in the $CO_2$ recovery system of the second embodiment. In addition, the amount of the acidic water 105 delivered to the sub-regenerator 31d can be reduced by concentrating the acidic water 105 containing the basic amine compounds dissolved therein in the concentrating unit 23r. This can facilitate the treatment in the sub-regenerator 31d. In other words, since the amount of the acidic water 105 supplied to the sub-regenerator 31d is reduced, the sub-regenerator 31d can be reduced in size, and the vapor consumption during sub-regeneration in the sub-regenerator 31d can be reduced.

In this $CO_2$ recovery system, the acidic water 105 containing the basic amine compounds dissolved therein is concentrated in the concentrating unit 23r, and the amount of the acidic water 105 delivered to the wastewater treatment unit 23j can thereby be reduced. Therefore, in addition to the advantageous effects of the $CO_2$ recovery system of the first embodiment, the treatment in the wastewater treatment unit 23j can be facilitated. In other words, since the amount of the acidic water 105 supplied to the wastewater treatment unit 23j is reduced, the wastewater treatment unit 23j can be reduced in size.

In particular, when a catalytic oxidation method or a waste liquid combustion method is used for the treatment of wastewater, the use of the concentrated acidic water 105 reduces the treated volume. This can reduce the size of the system and can also reduce the consumption of the auxiliary fuel. For example, when the concentration factor of the concentrating unit 23r is set to 10, the supply flow rate to the wastewater treatment unit 23j can be reduced by a factor of 10. When the waste liquid combustion method is used, the amount of the auxiliary fuel used can be reduced by a factor of 10 or more.

A $CO_2$ recovery method of the second embodiment includes the steps in the $CO_2$ recovery method of the first embodiment described above. The $CO_2$ recovery method of the second embodiment further includes the step of concentrating the acidic water 105 before the step of supplying, to the step of adding basic sodium, part of the acidic water 105 containing the basic amine compounds removed from the decarbonated flue gas 101A.

In this $CO_2$ recovery method, the acidic water 105 containing the basic amine compounds dissolved therein is concentrated, and accordingly, the amount of the acidic water 105 used in the step of supplying, to the step of adding basic sodium, part of the acidic water 105 containing the basic amine compounds removed from the decarbonated flue gas 101A can be reduced. Therefore, in addition to the advantageous effects of the $CO_2$ recovery method of the first embodiment described above, the treatment for rendering the basic amine compounds harmless can be facilitated.

As described above, the $CO_2$ recovery method of the second embodiment includes the steps in the $CO_2$ recovery method of the first embodiment described above. The $CO_2$ recovery method of the second embodiment further includes the step of concentrating the acidic water 105 used in the step of rendering harmless the acidic water 105 containing the basic amine compounds.

In this $CO_2$ recovery method, the acidic water 105 containing the basic amine compounds dissolved therein is concentrated, and the amount of the acidic water 105 used in the step of rendering the basic amine compounds harmless can thereby be reduced. Therefore, in addition to the advantageous effects of the $CO_2$ recovery method of the first embodiment described above, the treatment for rendering the basic amine compounds harmless can be facilitated.

Third Embodiment

Figure 3:
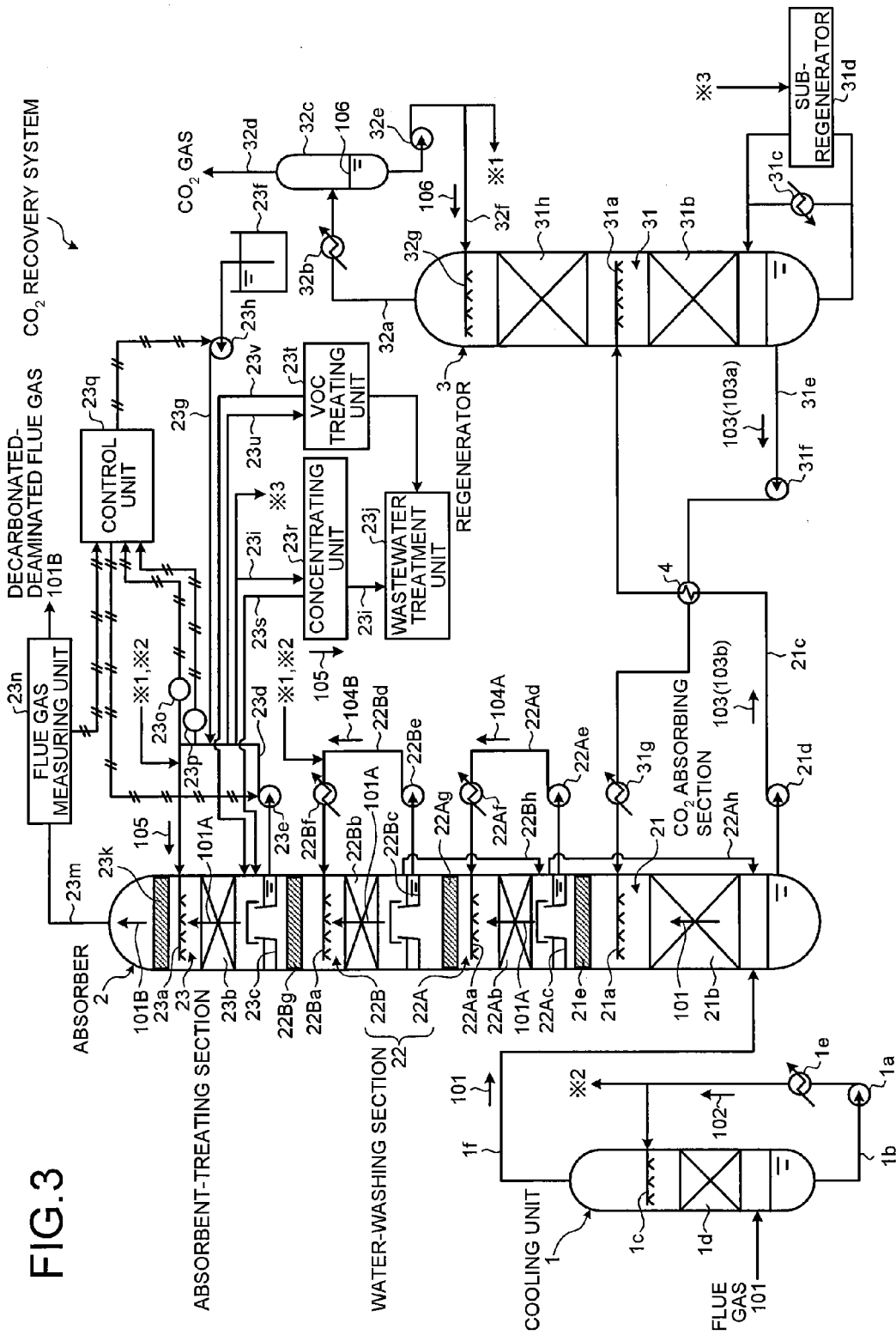
FIG. 3 is a schematic diagram of a $CO_2$ recovery system according to a third embodiment of the present invention.
Figure 4:
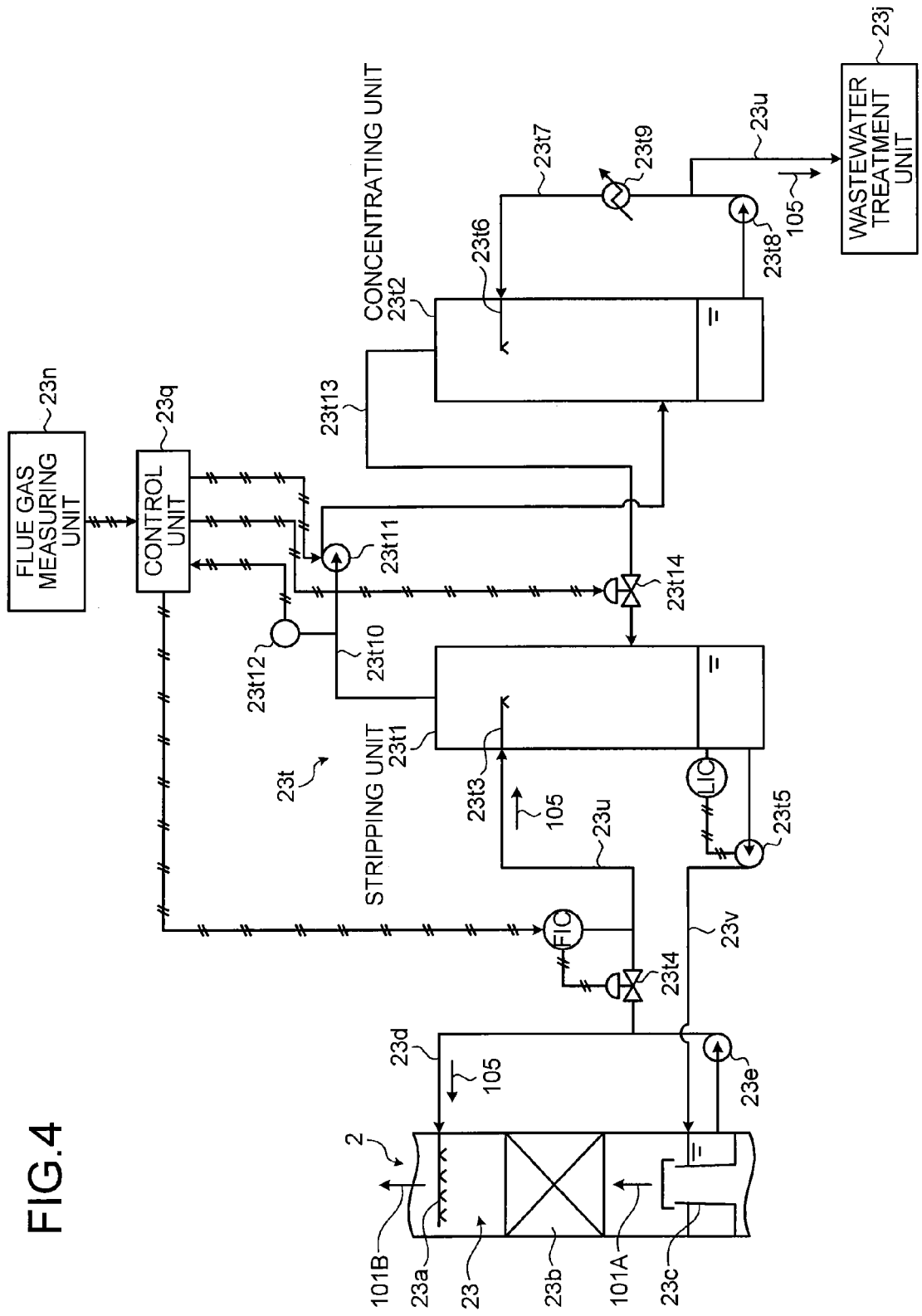
FIG. 4 is a schematic diagram of an example (the reduced-pressure stripping type) of a volatile organic compound-treating unit shown in FIG. 3.
Figure 5:
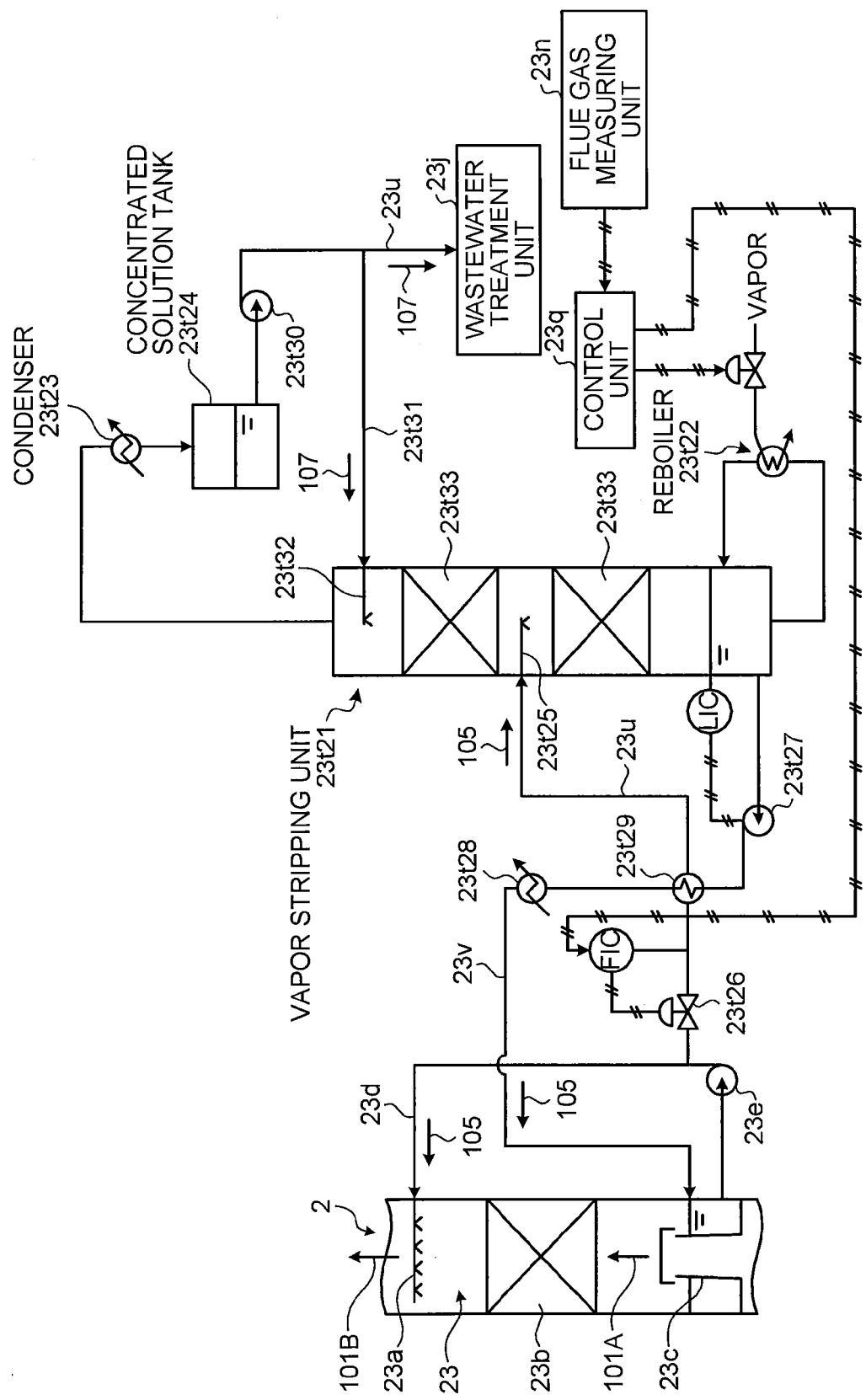
FIG. 5 is a schematic diagram of an example (the steam stripping type) of the volatile organic compound-treating unit shown in FIG. 3.

A third embodiment will be described with reference to the drawings. FIG. 3 is a schematic diagram of a $CO_2$ recovery system according to the third embodiment. FIG. 4 is a schematic diagram of an example (reduced-pressure stripping type) of a volatile organic compound-treating unit shown in FIG. 3. FIG. 5 is a schematic diagram of an example (steam stripping type) of the volatile organic compound-treating unit shown in FIG.

As shown in FIG. 3, the $CO_2$ recovery system of the third embodiment includes, in addition to the components in the second embodiment described above, a volatile organic compound-treating unit (VOC treating unit) 23t. The other components of the $CO_2$ recovery system of the third embodiment are the same as those of the $CO_2$ recovery system of the second embodiment. Therefore, the same components are designated by the same reference numerals, and their description will be omitted. In FIG. 3, the volatile organic compound-treating unit 23t is added to the $CO_2$ recovery system of the second embodiment provided with the concentrating unit 23r described above (see FIG. 2). However, the volatile organic compound-treating unit 23t may be added to the $CO_2$ recovery system of the first embodiment not provided with the concentrating unit 23r (see FIG. 1) or to the $CO_2$ recovery system of the first embodiment not provided with the wastewater treatment unit 23j and the concentrating unit 23r.

The volatile organic compound-treating unit (VOC treating unit) 23t separates volatile organic compounds, such as aldehyde, dissolved in the acidic water 105 together with the basic amine compounds from the decarbonated flue gas 101A. The volatile organic compound-treating unit 23t is disposed in an acidic water discharge tube 23u connected to the acidic water tube 23d and the wastewater treatment unit 23j in the absorbent-treating section 23.

The volatile organic compound-treating unit 23t may be of the reduced-pressure stripping type or of the steam stripping type. The volatile organic compound-treating unit 23t of the reduced-pressure stripping type includes a stripping unit 23t1 and a concentrating unit 23t2, as show in FIG. 4. Nozzles 23t3 are disposed in the upper portion of the stripping unit 23t1. The nozzles 23t3 are connected to the acidic water tube 23d side of the water circulation unit through the acidic water discharge tube 23u having a throttle valve 23t4 disposed therein. In the stripping unit 23t1, the bottom portion thereof is connected to the water receiver 23c of the water circulation unit through a return tube 23v. A return pump 23t5 is disposed in the return tube 23v. Nozzles 23t6 are disposed in the upper portion of the concentrating unit 23t2. The nozzles 23t6 are connected to the lower exterior portion of the concentrating unit 23t2 through a concentrated wastewater tube 23t7. A concentrated wastewater pump 23t8 and a cooling unit 23t9 are disposed in the concentrated wastewater tube 23t7, and the concentrated wastewater tube 23t7 is connected to the wastewater treatment unit 23j side of the acidic water discharge tube 23u. The top portion of the stripping unit 23t1 is connected to the lower central portion of the concentrating unit 23t2 through a stripped gas tube 23t10. A striped gas pump 23t11 and a pressure gauge 23t12 for measuring the pressure of the top portion of the stripping unit 23t1 are disposed in the stripped gas tube 23t10. The top portion of the concentrating unit 23t2 is connected to the lower portion of the stripping unit 23t1 through a concentrated gas tube 23t13. A throttle valve 23t14 is disposed in the concentrated gas tube 23t13. The stripping unit 23t1 and the concentrating unit 23t2 may be of the tray tower type.

In the volatile organic compound-treating unit 23t of the reduced-pressure stripping type, part of the acidic water 105 circulated through the water circulation unit is supplied to the upper portion of the stripping unit 23t1. In the stripping unit 23t1, the volatile organic compounds contained in the acidic water 105 move from the liquid phase to the gas phase through the gas supplied from the concentrated gas tube 23t13. Therefore, the concentrations of the volatile organic compounds in the solution in the return tube 23v are reduced, and this solution is returned to the absorbent-treating section 23. Gas containing the volatile organic compounds is supplied from the top portion of the stripping unit 23t1 to the concentrating unit 23t2 through the striped gas pump 23t11. Since the pressure in the concentrating unit 23t2 is higher than that in the stripping unit 23t1 and the temperature in the concentrating unit 23t2 is lower than that in the stripping unit 23t1, the volatile organic compounds move from the gas phase to the liquid phase and are concentrated in the circulation water in the concentrating unit 23t2. The solution containing the volatile organic compounds is supplied to the wastewater treatment unit 23j and is then rendered harmless. Gas reduced in concentration of the volatile organic compounds is obtained from the top of the concentrating unit 23t2 and is supplied to the stripping unit 23t1 through the concentrated gas tube 23t13.

The volatile organic compound-treating unit 23t of the steam stripping type includes a vapor stripping unit 23t21, a reboiler 23t22, a condenser 23t23, and a concentrated solution tank 23t24, as shown in FIG. 5. Nozzles 23t25 are disposed in the central portion of the vapor stripping unit 23t21. The nozzles 23t25 are connected to the acidic water tube 23d side of the water circulation unit through the acidic water discharge tube 23u including a throttle valve 23t26 disposed therein. The bottom portion of the vapor stripping unit 23t21 is connected to the water receiver 23c of the water circulation unit through the return tube 23v. A return pump 23t27 and a return solution cooling unit 23t28 are disposed in the return tube 23v. A heat exchanger 23t29 is disposed between the acidic water discharge tube 23u connected to the acidic water tube 23d side and the return tube 23v connected to the water receiver 23c. The reboiler 23t22 is used to heat the acidic water 105 accumulated in the bottom portion of the vapor stripping unit 23t21 by vapor and is disposed in the lower exterior portion of the vapor stripping unit 23t21. The top portion of the vapor stripping unit 23t21 is connected to the wastewater treatment unit 23j side of the acidic water discharge tube 23u. The condenser 23t23 and the concentrated solution tank 23t24 are disposed in the acidic water discharge tube 23u. In the acidic water discharge tube 23u, a concentrated solution pump 23t30 is disposed downstream of the concentrated solution tank 23t24. A reflux tube 23t31 is branched from the acidic water discharge tube 23u at a portion downstream of the concentrated solution pump 23t30. The reflux tube 23t31 is connected to the nozzles 23t32 disposed in the upper portion of the vapor stripping unit 23t21. In the vapor stripping unit 23t21, packed beds 23t33 are disposed below the nozzles 23t25 and the nozzles 23t32. However, the vapor stripping unit 23t21 may be of the tray tower type.

In this volatile organic compound-treating unit 23t of the steam stripping type, part of the acidic water 105 containing the volatile organic compounds that is circulated through the water circulation unit is supplied to the upper portion of the vapor stripping unit 23t21. In the vapor stripping unit 23t21, the acidic water 105 accumulated in the bottom portion thereof is heated by the reboiler 23t22, and the volatile organic compounds evaporate from the acidic water 105 and are delivered to the top portion together with vapor. The acidic water 105 in which the amounts of the volatile organic compounds have been reduced is returned to the absorbent-treating section 23 by the return pump 23t27 through the heat exchanger 23t29 and then the return solution cooling unit 23t28. The vapor containing the volatile organic compounds is discharged from the top portion of the vapor stripping unit 23t21 and is cooled in the condenser 23t23 to form a volatile organic compound-containing solution 107. The volatile organic compound-containing solution 107 is accumulated in the concentrated solution tank 23t24. At the same time, part of the volatile organic compound-containing solution 107 is refluxed to the vapor stripping unit 23t21 by the concentrated solution pump 23t30, and part of the volatile organic compound-containing solution 107 is delivered to the wastewater treatment unit 23j and is then rendered harmless.

As described above, the $CO_2$ recovery system of the third embodiment includes, in addition to the components in the $CO_2$ recovery systems of the first and second embodiments described above, the volatile organic compound removal unit 23t for reducing the amounts of the volatile organic compounds entrained in the decarbonated flue gas 101A together with the basic amine compounds by bringing the decarbonated flue gas 101A into contact with the acidic water 105.

In this $CO_2$ recovery system, even when the volatile organic compounds remain in the decarbonated flue gas 101A that has passed through the water-washing section 22, these volatile organic compounds together with the basic amine compounds are dissolved in the acidic water 105 and are separated from the decarbonated flue gas 101A. Therefore, in addition to the advantageous effects of the $CO_2$ recovery systems of the first and second embodiments described above, the concentrations of the residual volatile organic compounds discharged together with the decarbonated flue gas 101A can be further reduced.

The $CO_2$ recovery system of the third embodiment include the flue gas measuring unit 23n that measures the concentration of the volatile organic compounds in the decarbonated-deaminated flue gas 101B to be discharged to the outside of the $CO_2$ recovery system (i.e., the decarbonated-deaminated flue gas 101B from which the volatile organic compounds have been separated). In addition, the $CO_2$ recovery system further includes the control unit 23q that controls the volatile organic compound-treating unit 23t in which the amounts of the volatile organic compounds are reduced on the basis of the concentration of the volatile organic compounds measured by the flue gas measuring unit 23n.

The flue gas measuring unit 23n is disposed in the flue gas discharge tube 23m from which the flue gas (decarbonated flue gas) 101 is discharged to the outside of the $CO_2$ recovery system (the absorber 2). Examples of the flue gas measuring unit 23n include a total hydrocarbon concentration meter. The total hydrocarbon concentration meter can measure a concentration by introducing sample gas into a hydrogen flame ionization detector. More specifically, after methane is separated from the sample gas in a gas chromatography column, this sample gas is introduced into the hydrogen flame ionization detector to measure the concentration of non-methane hydrocarbons. With the total hydrocarbon concentration meter, the concentrations of amine compounds and volatile organic compounds (such as aldehydes) can be mainly measured.

The control unit 23q is composed of, for example, a microcomputer and includes a storage unit composed of a RAM, a ROM, etc. in which programs and data are stored. The storage unit includes stored therein data for controlling, on the basis of the concentration of the volatile organic compounds remaining in the flue gas (decarbonated flue gas) 101, the treatment capacity of the volatile organic compound-treating unit 23t for rendering the volatile organic compounds harmless. The control unit 23q controls, on the basis of the concentration measured by the flue gas measuring unit 23n and according to the programs and data stored in the storage unit in advance, the flow rate of the acidic water 105 supplied to the volatile organic compound-treating unit 23t. If the volatile organic compound-treating unit 23t is of the reduced-pressure stripping type, the control unit 23q controls the internal pressure of the stripping unit 23t1 and the flow rate of the return gas from the concentrating unit 23t2 such that they follow changes in the supply flow rate. If the volatile organic compound-treating unit 23t is of the vapor stripping type, the control unit 23q controls the amount of the vapor supplied to the reboiler 23t22 such that it follows changes in the supply flow rate.

In this $CO_2$ recovery system, the volatile organic compound-treating unit 23t for rendering the volatile organic compounds harmless is controlled on the basis of the concentrations measured by the flue gas measuring unit 23n. In this manner, the supply flow rate of the acidic water 105 supplied to the volatile organic compound-treating unit 23t to collect the volatile organic compounds can be controlled according to the concentration of the volatile organic compounds remaining in the decarbonated-deaminated flue gas 101B to be discharged to the outside of the $CO_2$ recovery system (the absorber 2).

A $CO_2$ recovery method of the third embodiment includes, in addition to the steps in the $CO_2$ recovery methods of the first and second embodiments described above, the step of reducing the amounts of the volatile organic compounds entrained in the decarbonated flue gas 101A together with the basic amine compounds by bringing the decarbonated flue gas 101A into contact with the acidic water 105.

In this $CO_2$ recovery method, even when the volatile organic compounds remain in the decarbonated flue gas 101A, these volatile organic compounds together with the basic amine compounds are dissolved in the acidic water 105 and separated from the decarbonated flue gas 101A. Therefore, in addition to the advantageous effects of the $CO_2$ recovery methods of the first and second embodiments described above, the concentrations of the residual volatile organic compounds discharged together with the decarbonated flue gas 101A can be further reduced.

The $CO_2$ recovery method of the third embodiment further includes the steps of: measuring the concentration of the volatile organic compounds in the decarbonated-deaminated flue gas 101B to be discharged to the outside of the $CO_2$ recovery system (i.e., the decarbonated-deaminated flue gas 101B in which the amounts of the volatile organic compounds have been reduced); and adjusting the flow rate of the acidic water 105 supplied to the step of reducing the amounts of the volatile organic compounds on the basis of the measured concentrations of the volatile organic compounds.

In this $CO_2$ recovery method, the supply flow rate of the acidic water 105 used to collect the volatile organic compounds can be adjusted according to the concentration of the volatile organic compounds in the decarbonated-deaminated flue gas 101B to be discharged to the outside of the $CO_2$ recovery system.

EXAMPLES

In the following Examples, the concentrations of the basic amine compounds and volatile organic compounds remaining in the decarbonated flue gas were examined on different $CO_2$ recovery systems (see FIG. 6).

In a Conventional Example, the tests were conducted on a $CO_2$ recovery system not provided with the absorbent-treating section 23 described above. The concentration of the basic amine compounds discharged from the absorber was 8 [ppm], and the concentration of the discharged volatile organic compounds was 5 [ppm]. In the Example, the tests were conducted on the $CO_2$ recovery system shown in FIG. 3. The pH of the acidic water was set to 5.0, and the circulation flow rate of the acidic water from the acidic water discharge pump was set such that the ratio of liquid/gas was 2.5. The acidic water was supplied to the volatile organic compound-treating unit at a flow rate equal to 20[%] of the circulation flow rate. In this case, the concentration of the basic amine compounds discharged from the absorber was 0.2 [ppm] or less, and the concentration of the discharged volatile organic compounds was 0.5 [ppm] or less. As described above, in the $CO_2$ recovery system used in the Example, the concentration of the basic amine compounds discharged from the absorber was equal to or less than 1/40 of that in the Conventional Example, and the concentration of the discharged volatile organic compounds was equal to or less than 1/10 of that in the Conventional Example.

As can be seen from the results in FIG. 6, in the Example, the concentrations of the basic amine compounds and the volatile organic compounds can be further reduced as compared to the concentrations of those remaining in the decarbonated flue gas.

INDUSTRIAL APPLICABILITY

As described above, the $CO_2$ recovery system and method according to the present invention are suitable for further reducing the concentrations of the basic amine compounds remaining in the decarbonated flue gas.

REFERENCE SIGNS LIST 1 cooling unit
2 absorber
21 $CO_2$ absorbing section
22 water-washing section
22A first water-washing section
22B second water-washing section
23 absorbent-treating section
23a nozzle
23b packed bed
23c water receiver
23d acidic water tube
23e acidic water circulation pump
23f acid tank
23g aqueous acid solution tube
23h aqueous acid solution pump
23i acidic water discharge tube
23j wastewater treatment unit
23k demister
23m flue gas discharge tube
23n flue gas measuring unit
23o pH measuring unit
23p flow rate measuring unit
23q control unit
23r concentrating unit
23s water return tube
23t volatile organic compound-treating unit
23Ta stripping unit
23Tb concentrating unit
23Tc nozzle
23Td return tube
23Te return pump
23Tf nozzle
23Tg concentrated wastewater tube
23Th concentrated wastewater pump
23Ti cooling unit
23Tk stripped gas tube
23Tm striped gas pump
23Tn pressure gauge
23Tp condensed vapor tube
23Tq throttle valve
23u acidic water discharge tube
3 regenerator
4 rich-lean heat exchanger
101 flue gas
101A decarbonated flue gas
101B decarbonated-deaminated flue gas
102 cooling water
103 basic amine compound absorbent
103a lean solution
103b rich solution
104A, 104B wash water
105 acidic water
106 condensed water
107 volatile organic compound-containing solution

The invention claimed is:

1. A $CO_2$ recovery system comprising:
an absorber including a $CO_2$ absorbing section and at least one water-washing section, the $CO_2$ absorbing section allowing flue gas to comes into contact with a basic amine compound absorbent so that the basic amine compound absorbent absorbs $CO_2$ in the flue gas, the at least one water-washing section allowing the decarbonated flue gas in which an amount of $CO_2$ has been reduced in the $CO_2$ absorbing section to come into contact with wash water to reduce amounts of the basic amine compounds entrained in the decarbonated flue gas;
a regenerator for releasing the $CO_2$ from the basic amine compound absorbent containing the $CO_2$ absorbed therein;
an absorbent-treating section disposed downstream of the at least one water-washing section through which the decarbonated flue gas flows, the absorbent-treating section allowing the decarbonated flue gas to come into contact with circulating acidic water to further reduce the amounts of the basic amine compounds entrained in the decarbonated flue gas;
an acidic water circulation pump for circulating the circulating acidic water; and
a control unit for adjusting a pH value of the acidic water to a desired value by controlling a flow rate of the acidic water circulation pump for obtaining salts of the basic amine compounds by contact with the decarbonated flue gas.

2. The $CO_2$ recovery system of claim 1, further comprising:
a sub-regenerator for adding basic sodium to the basic amine compound absorbent from the regenerator; and an acidic water discharge tube for supplying, to the sub-regenerator, part of the acidic water containing the basic amine compounds removed from the decarbonated flue gas.

3. The $CO_2$ recovery system of claim 2, further comprising a concentrating unit for concentrating the acidic water containing the basic amine compounds before the acidic water is delivered to the sub-regenerator.

4. The $CO_2$ recovery system of claim 1, further comprising a wastewater treatment unit for rendering harmless the acidic water containing the basic amine compounds removed from the decarbonated flue gas.

5. The $CO_2$ recovery system of claim 4, further comprising a concentrating unit for concentrating the acidic water containing the basic amine compounds before the acidic water is delivered to the wastewater treatment unit.

6. The $CO_2$ recovery system of claim 1, further comprising a demister for collecting the acidic water in a mist form that is entrained in the decarbonated-deaminated flue gas in which the amounts of the basic amine compounds has been reduced.

7. The $CO_2$ recovery system of claim 1, wherein condensed water generated when $CO_2$ gas recovered from the basic amine compound absorbent is cooled or condensed water generated when the flue gas to be supplied to the $CO_2$ absorbing section is cooled is supplied as replenishing water for the acidic water.

8. The $CO_2$ recovery system of claim 1, further comprising:
a flue gas measuring unit for measuring a concentration of the basic amine compounds in the decarbonated-deaminated flue gas in which the amounts of the basic amine compounds have been reduced; and
a control unit for adjusting a pH value of the acidic water or a flow rate of the acidic water on the basis of the concentration of the basic amine compounds measured by the flue gas measuring unit.

9. The $CO_2$ recovery system of claim 1, further comprising a volatile organic compound removal unit (23*t*) for reducing amounts of volatile organic compounds entrained in the decarbonated flue gas together with the basic amine compounds by bringing the decarbonated flue gas into contact with the acidic water.

10. The $CO_2$ recovery system of claim 9, further comprising:
a flue gas measuring unit for measuring a concentration of the volatile organic compounds in the decarbonated-deaminated flue gas in which the amounts of the volatile organic compounds and the amounts of the basic amine compounds have been reduced; and
a control unit for adjusting a flow rate of the acidic water supplied to the volatile organic compound removal unit (23*t*) on the basis of the concentration of the volatile organic compounds measured by the flue gas measuring unit.

* * * * *